TRANSISTOR MAGNETIC AMPLIFIER PULSE CIRCUIT
Filed Oct. 26, 1964
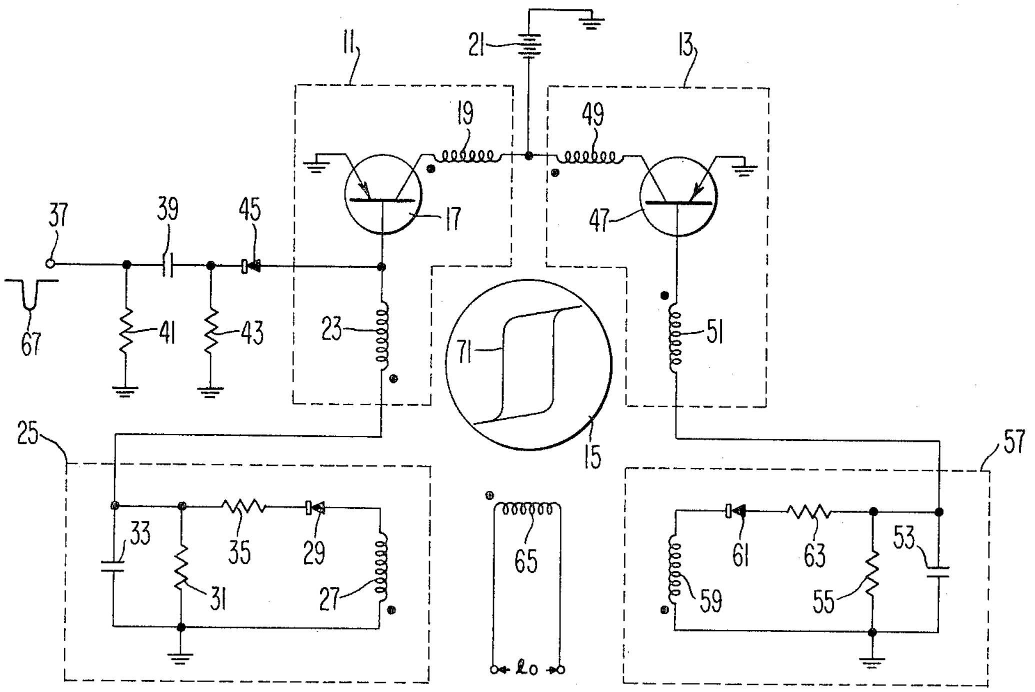
Fig. 1
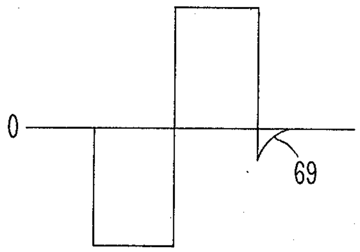
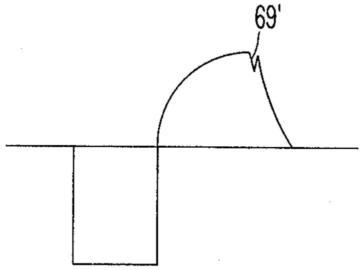
Fig. 2 Fig. 3
INVENTORS.
JAMES R. BACON
GEORGE H. BARNES
ALBERT J. MEYERHOFF
BY
Kevin C. McMahon
ATTORNEY

United States Patent Office 3,489,916

Patented Jan. 13, 1970

3,489,916

TRANSISTOR MAGNETIC AMPLIFIER PULSE CIRCUIT

James R. Bacon, Philadelphia, George H. Barnes, West Chester, and Albert J. Meyerhoff, Wynnewood, Pa., assignors to Burroughs Corporation, Detroit, Mich., a corporation of Michigan Filed Oct. 26, 1964, Ser. No. 406,267
Int. Cl. H03k *3/26;* G11c *11/06*
U.S. Cl. 307—88 11 Claims

ABSTRACT OF THE DISCLOSURE

An electrical pulse circuit for reacting to an input trigger pulse and for maintaining said reaction for sufficient duration to be read as an output pulse and for returning itself to its initial electrical state. A first transistor amplifier having means to accept trigger inputs is connected in circuit to a second transistor magnetic amplifier, both amplifiers being inductively coupled through a common magnetic core of square hysteresis loop material. The operation of the first amplifier charges a trigger circuit, also coupled to the core, to cause the second amplifier to reset the core after the core is switched by the first amplifier. A temporary bias circuit connected with the first amplifier, and also inductively coupled to the core, prevents "free-running" of the pulse circuit after reset.

This invention relates generally to transistor magnetic amplifier pulse circuits and, more particularly, to pulse circuits consisting of two transistor magnetic amplifiers wound on the same square loop magnetic core.

Magnetic cores of square hysteresis loop material have found wide acceptance and use in electronic computer circuits since they can be made to assume and maintain one of two magnetic states, arbitrarily defined as "0" and "1." Information represented by the condition of magnetic cores may be processed through logic circuits using such cores.

A transistor magnetic pulse amplifier is frequently used as a driver for magnetic core switching circuits. In such an amplifier, hereafter referred to as a TMA, a transistor is regeneratively connected through collector and base windings on a common square hysteresis loop magnetic core. When a pulse of proper polarity to forward bias the transistor is applied to the base, collector current begins to flow. The flow of collector current tends to switch the core to its opposite magnetic state and induces a voltage in the base winding of a polarity to increase the conduction of the transistor until the transistor saturates or bottoms. The switching process is now self-sustaining and the input pulse can be removed.

The core will continue to switch until it approaches saturation. As core saturation is approached, the amount of collector current required to continue the switching increases sharply. The collector current can no longer maintain the core switching and the regenerating voltage begins to decrease thereby reducing the base current and quickly cutting off the transistor. The flux about the core rapidly collapses, and the core lapses to its new remanent state.

Circuits which produce rectangular pulse pattern outputs of a given magnitude and duration for any short pulse input have wide application in electronic data processing apparatus and other electronic equipment. The ping-pong is a circuit involving square loop magnetic cores that develops such an output. When it is triggered by a pulse input, it operates to switch the cores from their original state of magnetization to the opposite state. The voltages generated in associated windings by this switching then act to reset the cores to their original state. The rectangular pulse pattern output is taken from an output winding on one of the cores. The ping-pong is a term sometimes applied to a dynamic storage element. In its operation, if the device starts in the ONE state, a drive or trigger pulse changes it to a second state, from which it is returned to the ONE state. Switching generates an output waveform indicating the stored ONE. If the device starts in the ZERO state, the drive produces no change of state and no resulting output is generated.

In the past, ping-pong circuits have required a plurality of magnetic cores. It was necessary that the switching of one core generate relatively large amounts of power in the windings since only passive element coupling existed between cores. The power generated by the switching of one core was used directly to switch another core. Also, ping-pong circuits have shown a tendency to "free-run" by triggering themselves in the resetting portion of their operating cycle. These difficulties presented problems in design and the necessity for a plurality of cores increased costs for the circuit.

It is, therefore, an object of our invention to provide a ping-pong circuit wound on a single square loop core.

A further object of our invention is to provide a ping-pong circuit wound on a single core in which an active rather than a passive element is the core switching mechanism.

A further object of the invention is to provide a ping-pong circuit which will not "free-run," using a single core.

A further object of the invention is to provide a dynamic storage element, which element switches to a reference state and back again in response to an input trigger only when the element initially is in a particular one of its bistable storage conditions.

In carrying out the objects of our invention, we provide two TMA's wound on the same square loop magnetic core with their windings in the opposite sense. When the core stores a particular one of its bistable values, the triggering of the first TMA switches the core. Since the windings of the second TMA are wound in the opposite sense to those of the first, the flux generated in the core by the switching holds the second TMA off during the operation of the first. A trigger circuit for the second TMA is provided. This circuit includes a winding on the core which charges a capacitor during the operation of the first TMA. At the collapse of the field generated by the switching of the first TMA, the voltage on the capacitor triggers the second TMA which resets the core.

When the field caused by the switching of the second TMA collapses, this collapse causes a fly-back phenomenon to be exhibited whereby a voltage of opposite polarity to that induced by the switching of the core is generated in the windings. This fly-back phenomenon tends to cause the ping-pong to "free-run" by triggering the first TMA on the collapse of the field generated by the second TMA in resetting the core. This is prevented by providing a temporary bias circuit which holds the first TMA off during the fly-back portion of the second TMA's operation. When the core is already in its switched state, the trigger cannot cause the TMA to regenerate due to transformer coupling since the core is merely driven along the flat portion of the hysteresis loop. Thus the second TMA is never caused to turn on and no output is generated.

Various objects, advantages and features of our invention will become more fully apparent from the following specification, appended claims, and accompanying drawing in which:

FIGURE 1 is a schematic diagram of applicants' TMA ping-pong circuit wound on a single core.

FIGURE 2 is the output voltage waveform from the ping-pong circuit of FIGURE 1.

FIGURE 3 is the voltage waveform at the base of the first TMA transistor of the ping-pong circuit of FIGURE 1.

Our invention can be best understood by referring to the following detailed description of the illustrated embodiment. In the following operation, it is understood that the core is storing a binary value and starts out in a switchable state. It is also understood that if the core starts out in its switched state, no output is generated.

Referring to FIGURE 1 of the drawings, the windings are in a direction such that current into the dotted end of any coil will operate to set the core to the "0" state and will induce in the other coils a voltage having its positive polarity at the dotted end of the coil. TMA's 11 and 13 have all their windings on square loop magnetic core 15. TMA 11 consists of PNP transistor 17, winding 19 connected to the collector of transistor 17, and base winding 23 connected to the base of transistor 17. The free ends of collector winding 19 and base winding 23 are connected to a negative voltage supply 21 and the temporary bias circuit 25, respectively. The emitter of transistor 17 is grounded. The dotted ends of coils 19 and 23 are in the direction of the collector of transistor 17 and temporary bias circuit 25, respectively.

The temporary bias circuit 25 includes a coil 27 wound upon core 15, the dotted end of the coil being grounded and the other end being connected to the anode of diode 29. The cathode of diode 29 is connected through resistor 35 to the parallel combination of resistor 31 and capacitor 33. The other end of the parallel combination is grounded. The connection between winding 23 and temporary bias circuit 25 is made at the junction of resistors 31 and 35 and capacitor 33.

Trigger input 37 for TMA 11 is connected to capacitor 39 and resistor 41. The other side of capacitor 39 is connected to resistor 43 and the cathode of diode 45. The free ends of resistors 43 and 41 are grounded. The anode of diode 45 is connected to the base of transistor 17.

PNP transistor 47 of TMA 13 has the dotted end of its collector winding 49 connected to negative power source 21 and the undotted end connected to the collector. Its emitter is grounded. Base winding 51 of TMA 13 has its dotted end connected to the base of transistor 47 and its undotted end connected to one end of the parallel combination of capacitor 53 and resistor 55 of the trigger circuit 57. Trigger circuit 57 also includes winding 59 on core 15 whose undotted end is connected to the cathode of diode 61. The anode of diode 61 is connected through resistor 63 to the juncture of the coil 51 and the parallel combination of capacitor 53 and resistor 55. The dotted end of coil 59 and the free end of the parallel combination are grounded. The output from the ping-pong is taken from output coil 65 wound on core 15.

Although our circuit has been described using PNP transistors, it is, of course, obvious that NPN transistors or other suitable active elements could equally well be used if the appropriate changes were made in polarity sensitive components and voltage source values and polarities. For the purposes of our invention, an active element is one whose output power is at least supplemented by sources other than the input but whose output state is dependent on that of the input.

In operation, a negative-going pulse 67 is impressed on trigger input 37. Any reasonable pulse with a fast-rise time will operate the circuit but its duration must not exceed the duration of operation of TMA 11 and should be somewhat less. If a longer pulse is used, capacitor 39 and resistor 43 should be adjusted to differentiate it. Capacitor 39 and resistor 43 also serve to decouple the trigger source 37 from TMA 11 thereby allowing temporary bias circuit 25 to work. The pulse is transmitted through capacitor 39 and diode 45 and causes transistor 17 of TMA 11 to begin to conduct.

Current enters the dotted terminal of collector winding 19 and generates a flux that begins to switch the core 15 to the "0" state. This change of flux induces a voltage in the other coils of the circuit. The voltage induced in base winding 23 drives the base of transistor 17 more negative thereby increasing collector-to-emitter conduction. The current and voltage build up rapidly in the normal regenerative TMA fashion until core 15 has switched completely to the "0" state, at which time the flux collapses and the conduction of transistor 17 ceases. During the build-up of the flux due to the operation of TMA 11, coil 59 of trigger circuit 57 charges capacitor 53 through diode 61 and resistor 63.

In order for the circuit to operate, the core must originally have been in the "1" state. If it were originally in the "0" state, the initial trigger pulse would merely drive the core further into saturation and only very small voltages would be generated in the other windings so the circuit would not operate regeneratively.

TMA 13 is held off during the time of switching of TMA 11 since its windings are wound in the opposite sense to the windings of TMA 11. Base winding 51 must have at least as many turns as winding 59 so that the voltage induced in winding 51 is greater than or equal to that induced in winding 59. Otherwise TMA 13 will trigger as soon as capacitor 53 charges sufficiently and will interfere with the switching of TMA 11. At the collapse of the flux caused by the switching of TMA 11, the charge on capacitor 53 impresses a negative voltage on the base of transistor 47 and begins collector-to-emitter conduction. TMA 13 then operates in the same manner as TMA 11 and resets the core to the "1" state. The flux generated in the core by this resetting induces a voltage in winding 27 which charges capacitor 33 through resistor 35 and diode 29 of temporary bias circuit 25. This holds TMA 11 off during the fly-back portion of the operation of TMA 13. The output waveform generated in coil 65 is shown in FIGURE 2.

The fly-back portion of the operation of TMA 13 occurs because the top of the hysteresis characteristic 71 of core 15 is not flat but slanted. Therefore, when the core returns from its saturated state to the remanent state, there is a decrease in the flux density in the core which induces in the windings a voltage opposite to that generated by the switching of the core. Temporary bias circuit 25 prevents this fly-back from retriggering TMA 11.

The effect of the temporary bias circuit 25 on TMA 11 can be seen in FIGURES 2 and 3 depending, respectively, on whether or not temporary bias circuit 25 is included in the ping-pong. If temporary bias circuit 25 is not included, the voltage waveform at the base of transistor 17 will be that of FIGURE 2. This is the same waveform as is induced in output winding 65. The fly-back portion 69 of the waveform will tend to cause TMA 11 to trigger spontaneously andd allow the ping-pong to free-run. FIGURE 3 shows the effect of the inclusion of temporary bias circuit 25 on the voltage waveform at the base of transistor 17. The fly-back region 69' remains well above the zero voltage level thereby eliminating the tendency to free-run.

An example of component values which were found to be suitable for our circuit is listed below:

| Component: | Value |
|---|---|
| Resistor **31** | 5K |
| Capacitor **33** | .001 |
| Resistor **35** | 470 |
| Capacitor **39** | .001 |
| Resistor **41** | 91 |
| Resistor **43** | 20K |
| Capacitor **53** | .002 |
| Resistor **55** | 1K |
| Resistor **63** | 470 |

All values of resistance given in ohms and all values of capacitance in microfarads.

We claim:

1. In a pulse circuit including a magnetic core having a substantially rectangular hysteresis loop, first and second regenerative circuits wound on said core for switching it from a first state of magnetization to the opposite state and back again, respectively, input means for activating said first regenerative circuit, and first and second control circuits on said core for controlling the operation of said regenerative circuits, said control circuits including capacitive means and means for unidirectionally charging said capacitive means, said first control circuit triggering the second regenerative circuit upon the completion of the operation of said first regenerative circuit and said second control circuit preventing said first regenerative circuit from retriggering during the fly-back portion of the switching of said core by said second regenerative circuit.

2. In a ping-pong circuit having two transistor magnetic amplifiers wound on the same square loop magnetic core with their windings in the opposite sense one to the other for switching the core from a first to the opposite state of magnetization and back again, a temporary bias circuit coupled to the first of said transistor magnetic amplifiers, said temporary bias circuit including a winding on said core, and unidirectionally conductive means and capacitive means serially connected with said winding wherein said winding unidirectionally charges said capacitive means for preventing the first of said transistor magnetic amplifiers from retriggering during the fly-back portion of the switching of said core by said second transistor magnetic amplifier.

3. A ping-pong circuit wound on one square loop magnetic core comprising:

a first and a second transistor magnetic amplifier, said transistor magnetic amplifiers each having a collector and a base winding regeneratively wound on said core wherein the windings of said first transistor magnetic amplifier are in the opposite sense to those of said second transistor amplifier, a trigger circuit coupled to the base of said second transistor magnetic amplifier including a winding on said core, and a diode and a capacitor serially connected with said winding wherein the operation of said first transistor magnetic amplifier causes the unidirectional charging of said capacitor for activating said second transistor magnetic amplifier at the completion of the operation of said first transistor magnetic amplifier, and means for activating said first transistor magnetic amplifier whereby said first transistor magnetic amplifier will operate to switch said core from a first state of magnetization to the opposite state of magnetization and said second transistor magnetic amplifier will operate to return the core to said first state.

4. The ping-pong circuit of claim 3 including a temporary bias circuit connected to said first transistor magnetic amplifier for preventing said first transistor magnetic amplifier from retriggering during the fly-back portion of the switching of said core by said second transistor magnetic amplifier having a winding on said core, a diode in series with said winding, and capacitive means in series with said winding and diode whereby said winding unidirectionally charges said capacitive means during the operation of said second transistor magnetic amplifier.

5. A ping-pong circuit using one square loop magnetic core comprising:

first and second regenerative circuits wound on said core with their windings in the opposite sense to each other and, a trigger circuit coupled to said second regenerative circuit, said trigger circuit having a winding on said core, and a diode and capacitive means serially connected to said winding for triggering said second regenerative circuit at the completion of the operation of said first regenerative circuit, and input means for triggering said first regenerative circuit whereby said first regenerative circuit operates to switch said core from a first to the opposite state of magnetization and said second regenerative circuit operates to return said core to the first state of magnetization.

6. The device of claim 5 including means on said core for biasing off the first regenerative circuit during the fly-back portion of the operation of said second regenerative circuit.

7. A memory ping-pong circuit using one square loop magnetic core comprising:

two transistor magnetic amplifiers regeneratively wound on said core with their windings in the opposite sense to each other, trigger means for actuating the first of said transistor magnetic amplifiers and for causing said core to be driven towards saturation in a reference direction, means on said core actuated by the operation of said first transistor magnetic amplifier for triggering the second of said transistor magnetic amplifiers only when said core is caused to switch from one stable state of magnetization to its opposite stable state of magnetization, and means coupled to said core for preventing said first transistor magnetic amplifier from retriggering during the fly-back portion of the switching of the core by said second transistor magnetic amplifier when it is caused to operate, and output means coupled to said core for sensing the initial storage condition of said core in response to an interrogation resulting from an input applied to said trigger means.

8. A pulse circuit comprising:

a magnetic core having a substantially square hysteresis loop, first and second transistor magnetic amplifiers for respectively switching said core from a first magnetization state to a second magnetization state and back to said first state, said transistor magnetic amplifiers each having a collector winding and a base winding regeneratively wound to said core, the windings of said first amplifier being in the opposite sense to those of said second amplifier, trigger pulse input means capable of generating pulses to activate said first amplifier, said pulses having a substantially fast-rise time and a duration not exceeding the duration of operation of said first amplifier, first means coupled to said core actuated by the operation of said first amplifier including a unidirectionally charging capacitor for activating said second amplifier at the completion of operation of said first amplifier, second means coupled on said core including a unidirectionally charging capacitor for biasing off said first amplifier during the fly-back portion of operation of said second amplifier, and third means for decoupling said trigger pulse input means from said first amplifier during the operation of said second means.

9. A pulse circuit comprising:

a magnetic core having a substantially square hysteresis loop, first regenerative means coupled to said core including active element means for switching said core from a first state of magnetization to a second opposing state of magnetization, second regenerative means coupled to said core including active element means for switching said core from said second state back to said first state, and means coupled to said core including a unidirectionally charging capacitor actuated by the operation of said first regenerative means for activating said second regenerative means.

10. A pulse circuit comprising:

a magnetic core having a substantially square hysteresis loop, first regenerative means on said core for switching it from a first state of magnetization to the opposite state of magnetization, a second regenerative means on said core for switching said core back to said first state of magnetization, each of said regenerative means including active element means, means actuated by the operation of said first regenerative means for activating said second regenerative means and means on said core for preventing said active means of said first regenerative means from retriggering during the fly-back portion of the switching of said core by said second regenerative means.

11. A pulse circuit comprising:

a square loop magnetic core, two transistor magnetic amplifiers regeneratively wound on said core with their windings in the opposite sense to each other, trigger means for actuating one of said transistor magnetic amplifiers, means on said core actuated by the operation of said one transistor magnetic amplifier for actuating the other of said transistor magnetic amplifiers, a temporary bias circuit on said core for preventing the operation of said other transistor magnetic amplifier from retriggering said one transistor magnetic amplifier whereby said one transistor magnetic amplifier operates to switch said core from a first state of magnetization to the opposite state of magnetization and said other transistor magnetic amplifier operates to return the core to said first state.

References Cited

UNITED STATES PATENTS

| | | | |
|---|---|---|---|
| 3,128,389 | 4/1964 | Paull | 307—88 |
| 3,162,768 | 12/1964 | Lode | 307—88 |
| 3,233,113 | 2/1966 | Apple et al. | 307—88 |

BERNARD KONICK, Primary Examiner

V. P. CANNEY, Assistant Examiner